(12) United States Patent
Aab

(10) Patent No.: US 6,357,012 B1
(45) Date of Patent: Mar. 12, 2002

(54) MICROCONTROLLER WITH AUTO-ALARM DEVICE

(75) Inventor: Volker Aab, Lichtenau-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/142,979
(22) PCT Filed: Mar. 19, 1997
(86) PCT No.: PCT/DE97/00553
§ 371 Date: Apr. 26, 1999
§ 102(e) Date: Apr. 26, 1999
(87) PCT Pub. No.: WO97/35246
PCT Pub. Date: Sep. 25, 1997

(30) Foreign Application Priority Data

Mar. 19, 1996 (DE) .......................... 196 10 627

(51) Int. Cl.⁷ .......................... G06F 1/32; G08B 21/00; H02H 3/24
(52) U.S. Cl. .................. 713/322; 713/323; 340/663; 361/90; 361/92
(58) Field of Search ................ 713/300–340; 714/14

(56) References Cited

U.S. PATENT DOCUMENTS

| | | | | | |
|---|---|---|---|---|---|
| 4,722,059 A | * | 1/1988 | Engel et al. | ................ | 364/483 |
| 4,908,523 A | * | 3/1990 | Snowden et al. | ............. | 307/43 |
| 4,965,738 A | * | 10/1990 | Bauer et al. | ................ | 364/483 |
| 5,073,943 A | * | 12/1991 | Chapman | ..................... | 381/86 |
| 5,230,056 A | * | 7/1993 | Hoshina | ..................... | 713/340 |
| 5,239,652 A | * | 8/1993 | Seibert et al. | .............. | 713/323 |
| 5,355,502 A | * | 10/1994 | Lester et al. | | |
| 5,428,252 A | * | 6/1995 | Walker et al. | ................ | 307/64 |
| 5,633,573 A | * | 5/1997 | Phuoc et al. | ................... | 320/5 |
| 5,729,722 A | * | 3/1998 | Matsumoto | .................. | 713/601 |
| 5,737,588 A | * | 4/1998 | Maeda et al. | ............... | 713/500 |
| 5,924,979 A | * | 7/1999 | Swedlow et al. | ........... | 600/300 |

FOREIGN PATENT DOCUMENTS

| | | | |
|---|---|---|---|
| DE | 43 02 232 | * | 8/1994 |
| EP | 0 608 524 A | * | 8/1993 |
| WO | WO 85 02275 | * | 5/1985 |

OTHER PUBLICATIONS

C. Melear, "Hardware and Software Techniques for Power Conservation in Portable Devices", Institute of Electrical and Electronics Engineers, WESCON '94, Sep. 27, 1994, pp. 453–461.*

* cited by examiner

Primary Examiner—Sumati Lefkowitz
(74) Attorney, Agent, or Firm—Kenyon & Kenyon

(57) ABSTRACT

A microcontroller with a self-prompting (self-wake-up) device, particularly for use in electrical adjusting drives, having a control device for specifying an active and an inactive operating state to economize on supply power, contains an oscillator for emitting a prompting signal or a clock frequency. This oscillator is a low-frequency, power-saving oscillator. Provided in the microcontroller is a circuit, preferably a disconnectible phase-locking loop, which, from the low frequency of the oscillator, generates a substantially higher clock frequency for microcontroller core. The low-frequency oscillator is also integrated as an original component into the microcontroller. An undervoltage detection, whose output signal is able to be supplied directly to the microcontroller core, indicates undervoltage conditions immediately. Using a time-switch logic which monitors a non-operative time of the microcontroller core, the core is activated again via a prompting circuit. In the case of certain functions, it is also possible to work in a power-saving manner solely with the low frequency. Thus, a necessary buffer capacitance can be smaller.

10 Claims, 1 Drawing Sheet

MICROCONTROLLER WITH AUTO-ALARM DEVICE

FIELD OF THE INVENTION

The present invention relates to on a microcontroller having a self-prompting (self-wake-up) device, particularly for use in electrical adjusting drives.

BACKGROUND INFORMATION

In a known microcontroller having a self-prompting device, as described in German Patent Application No. 4302 232, which is intended to be used particularly in electrical adjusting drives, it is provided with a control device for specifying an active and an inactive operating state in order to economize on supply power, as well as with an oscillator for emitting a prompting (wake-up) signal. This oscillator is provided outside of the microcontroller and, has a relatively low clock frequency. Besides the prompting of the microcontroller by an internal signal emitted by the watchdog, the prompting is also possible at regular, periodically recurrent time intervals by the external prompting signal supplied by the external oscillator and fed to the control circuit. The prompting takes place independently of the operating state prevailing at the moment. The cycle of this external prompting signal should be calculated in such a way that the microcontroller remains in the inactive state as long as possible, in order to attain low average energy consumption. On the other hand, the cycle should be short enough to be able to react sufficiently quickly to a changed operating situation, it being possible to communicate this via input lines. Therefore, if no internal prompting signal occurs in the meantime, this known microcontroller is always prompted in the rhythm of the external oscillator.

SUMMARY OF THE INVENTION

A microcontroller with a self-prompting device having the characterizing features has the advantage of making available a complete assembly, in which a low-frequency oscillator exhibiting low current consumption is integrated into the microcontroller as well, and which, in the event the high-frequency clock-pulse source is not in operation, is advantageously able to supply and operate the microcontroller core with this low clock frequency when there are few functions to be carried out. Consequently, an essential condition is created for it, namely that the microcontroller can be operated in an energy-saving manner, and a buffer capacitor in the control electronics to be provided for emergency cases can be selected to be considerably smaller, and thus can be installed in the control electronics as well.

According to the present invention, this is achieved in that the oscillator is a low-frequency oscillator, that provision is made in the microcontroller for a circuit which, from the low frequency of this oscillator, generates a substantially higher clock frequency for the microcontroller core, that the oscillator is integrated as an original component into the microcontroller as well, and that provision is made for an undervoltage detection circuit, whose output signal is able to be supplied directly to the microcontroller core.

According to one embodiment of the present invention, the circuit for generating the high clock frequency for the microcontroller core is a disconnectible phase-locking loop.

In another embodiment, the microcontroller of the present invention is provided with a prompting circuit which, after a specific time has elapsed, or in response to the occurrence of a specific event, shifts the microcontroller core from the inactive into the active operating state.

In another embodiment, the microcontroller of the present invention is provided with a time-switch logic which, after the expiration of a variably specifiable time span, acts upon the prompting circuit, so that the prompting circuit shifts the microcontroller core from the inactive into the active operating state.

In another embodiment of the present invention, the prompting signal of the prompting circuit activates that circuit which, from the low frequency of the low-frequency oscillator, generates the substantially higher clock frequency for the microcontroller core, in order to shift it from the inactive into the active operating state.

According to another embodiment of the present, the microcontroller of the present invention is provided with a multiplexer, via which the microcontroller core, in certain operating situations, is able to be directly supplied with the frequency of the low-frequency oscillator as its clock frequency.

In advantageous manner, after executing particular functions, the microcontroller core is able to be shifted into the inactive operating state for a specific time span which is adaptable to certain circumstances. In another embodiment of the present invention, the adaptable time span is programmable and is able to be stored in a time-comparison register provided in the time-switch logic.

The microcontroller of the present invention is designed such that the frequency of the low-frequency oscillator is, for example, 100 kHz, and the frequency generated therefrom for the microcontroller core is, for example, 10 MHz The microcontroller according to the present invention is preferably used for electrical adjusting drives of motor vehicles, and the undervoltage detection is connected directly to the electrical-system voltage, in order to detect undervoltage conditions without time delay.

BRIEF DESCRIPTION OF THE DRAWING

The FIGURE shows a block diagram of a microcontroller according to an exemplary embodiment of the present invention, having a self-prompting (self-wake-up) device.

DETAILED DESCRIPTION

Figure 1:
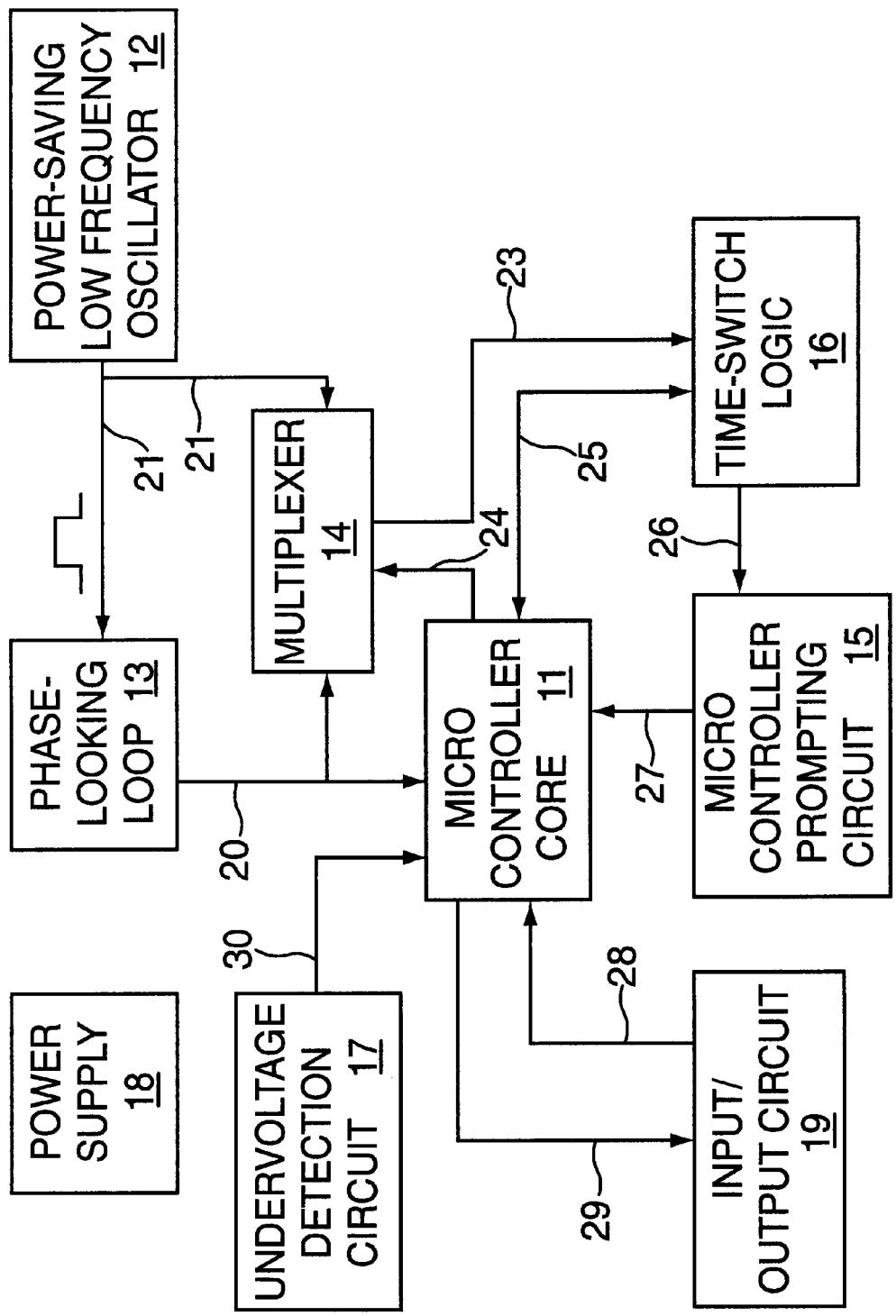

Microcontroller 10, shown schematically in the FIGURE as a block diagram, contains a microcontroller core 11, a power-saving low-frequency oscillator 12, a phase-locking loop 13, a multiplexer 14, a prompting circuit 15, a time-switch logic 16, as well as an undervoltage detection circuit 17 as essential components. In addition, a power supply 18 and an input/output circuit 19 are also shown in the block diagram.

Microcontroller core 11 is used to fulfill the tasks of microcontroller 10, and is operated with a specific clock frequency. For example, this clock frequency can be 10 MHz, if the clock pulse is supplied from phase-locking loop 13 via line 20. Phase-locking loop 13 generates this high clock frequency from low-frequency signals which are supplied on line 21 from low-frequency oscillator 12. For example, the frequency of oscillator 12 can be 100 kHz. Thus, phase-locking loop 13, for which preferably a PLL circuit (phase-locked loop circuit) is used, represents a circuit which generates a substantially higher clock frequency for microcontroller core 11 from the low frequency of oscillator 12. In this context, the phases of low and high clock frequency are in regulated, fixed relation to one another. The complete PLL circuit is disconnected in the inactive operating state since, because of the high frequency, it needs a high operating current.

Multiplexer 14, provided in microcontroller 10, receives the high clock frequency of phase-locking loop 13 via line 20, or the low frequency of low-frequency oscillator 12 via line 21. Time-switch logic 16 is driven via an output line 23, and is provided either with the high or the low clock frequency. Furthermore, a control signal is supplied from microcontroller core 11 via a line 24 to multiplexer 14. Time-switch logic 16 is in bidirectional signal exchange via line 25 with microcontroller core 11, and gives a signal via an output line 26 to prompting circuit 15. Prompting circuit 15 acts with its prompting signal, via an output line 27, upon microcontroller core 11, in order to bring microcontroller core 11 from the inactive into the active operating state. This takes place after a specific elapsed time span, which is determined during the active phase of microcontroller core 11, and is set via line 25 in a register in time-switch logic 16. Supplied with clock signals via multiplexer 14 and line 23, time-switch logic 16 monitors and compares the set time inputs. At the predetermined point of time, prompting circuit 15 is then driven via line 26.

Microcontroller core 11 is connected via an input line 28 and an output line 29 to input/output circuit 19. Illustratively, microcontroller core 11 is supplied with and acted upon by signals via this circuit which, e.g., come from the keyboard (e.g. data acquisition), relay drivers, positional-signal transmitters and other relevant and connected modules, and which are input via input line 28. Conversely, these modules are supplied via output line 29 with control and other signals by way of input/output circuit 19.

Following, important functions of microcontroller 10 according to the present invention are clarified in the light of the application of microcontroller 10. Position detection with the assistance of incremental encoders is employed for electrical adjusting drives in motor vehicles. Hall-effect sensors, for example, can be used for that purpose. Such drives having position detection are in use, e.g., for electrical window lifters with anti-squeeze or finger protection, sunroof drives and seat-adjustment systems with memory function. For such systems, the position detection should still be realizable, even after an emergency shutdown because of low voltage, particularly due to disconnect of the battery or the blowing of a vehicle fuse during the adjustment operation. The after-running time of a typical adjusting motor can be up to 100 ms. Since the position data must subsequently still be written into a non-volatile storage, the system of microcontroller plus sensors must be supplied from a capacitance for buffer times (or data-support times) of approximately 120 ms.

The minimal electrical-system voltage at which the drives are still driven is usually 9 V. A voltages of approximately 1.2 V for the polarity-reversal diode and the voltage drop at a voltage regulator are provided. The minimal functional voltage for Hall-effect sensors, which are used for position detection, and the microcontroller lies at approximately 3.8 V. Resulting from this is a permissible voltage drop in the buffer capacitance of $$\Delta U = 9\ V - 1.2\ V - 3.8\ V = 4\ V.$$

Thus, assuming 30 mA total current consumption for this system, a minimum magnitude of is yielded for the buffer capacitance.

$$C = \frac{I \cdot \Delta t}{\Delta U} = \frac{30\ \text{mA} \cdot 120\ \text{ms}}{4\ V} = 900\ \mu F$$

is yielded for the buffer capacitance.

Because of their large dimensions, capacitors of this capacitance can only be integrated with great difficulty into the customary motor-control electronics.

To reduce the average current consumption of the system, the microcontroller and Hall-effect sensors are switched in only for a time to sample the sensor level. Microcontroller 10 of the present invention meets the following requirements for this purpose:

- it has a power-saving, inactive operating state (power down mode);
- the start-up time of microcontroller 10 is perceptibly less than the sampling-time interval to be expected;
- microcontroller 10 contains an undervoltage detection 17 which, for example, is directly connected as threshold-value acquisition to the electrical-system voltage, and thus detects the undervoltage condition without time delay and communicates this condition via line 30 to microcontroller core 11;
- finally, with the expiration of a specific time after entering into the inactive operating state, or in response to the occurrence of a specific event, the microcontroller is shifted again into the active operating state by its self-prompting device.

If, in microcontroller 10 configured according to the present invention, it is determined in undervoltage detection circuit 17 that the electrical-system voltage has fallen below a minimum level, the following actions are carried out:

- the position signals of the Hall-effect sensors are evaluated; the Hall-effect sensors are disconnected;
- the desired time span for the inactive operating state is determined, and this value is set as comparison value in the register in the time-switch logic;
- the system clock pulse is changed over from phase-locking loop 13 to low-frequency oscillator 12; finally, microcontroller core 11 is stopped, i.e., microcontroller 10 is shifted into the inactive operating state (stop mode).

During the inactive operating state, time-switch logic 16 is supplied with the low-frequency clock pulse. This is taken into account when calculating the value for the inactive time span which is input into the register, so that the correct prompting (wake-up) time can be achieved. When the time span for the inactive operating state has elapsed, prompting circuit 15, initiated by a signal on line 26 of time-switch logic 16, will generate a prompting signal for microcontroller core 11, and supply it to microcontroller core 11 said core via line 27. The prompting signal causes phase-locking loop 13 to be activated. After the transient recovery time of phase-locking loop 13 of, e.g., approximately 200 μs has elapsed, microcontroller core 11 is fully functional.

If, within the active operating state, the running phase of microcontroller 10, only a few functions are carried out, e.g., the evaluation of the position signals of Hall-effect sensors, then with the assistance of appropriately controlled multiplexer 14, microcontroller core 11 is supplied only with the low-frequency clock pulse on output line 21 of low-frequency oscillator 12. In this case, phase-locking loop 13 does not have to be activated, and the associated transient recovery time is saved. Microcontroller core 11 is ready for operation immediately after receiving the prompting signal, but operates with the lower clock frequency. When the tasks are executed, the time span for the inactive operating state is determined anew, set in the register of time-switch logic 16, and the microcontroller shuts itself down for this time span.

The present invention provides a specially configured microcontroller having a self-prompting device in which, by switching into the active operating state for only brief periods, the average current consumption is advantageously reduced corresponding to the ratio of running time to non-operative time. Consequently, the buffer capacitance necessary for the case of emergency shutdown in response to undervoltage is reduced. The microcontroller can be operated both with high and with low frequency. During the inactive operating state, the clock pulse of the power-saving, low-frequency oscillator, which is also integrated into microcontroller 10, is made available.

What is claimed is:

1. A microcontroller for an electrical adjusting drive, comprising:
    a microcontroller core setting an active operating state and an inactive operating state of the microcontroller to conserve a supply power;
    a prompting circuit generating a prompting signal to the microcontroller core for switching the microcontroller from the inactive operating state to the active operating state after a predetermined time period or in response to an occurrence of a predetermined event;
    a low-frequency oscillator providing a basic clocking function and generating an oscillator signal which has a first clock frequency, the low-frequency oscillator being an original component of the microcontroller;
    a further circuit generating, as a function of the oscillator signal, a circuit signal for the microcontroller core, the circuit signal having a second clock frequency which is higher than the first clock frequency;
    an undervoltage detection circuit generating an output signal which is provided directly to the microcontroller core,
    wherein, if the undervoltage detection circuit determines that a voltage is below a predetermined level:
        the microcontroller core evaluates position signals of position sensors and disconnects the position sensors,
        a first arrangement determines the predetermined time period,
        a second arrangement changes a system clock pulse from the circuit signal having the second clock frequency to the oscillator signal having the first clock frequency, and
        the microcontroller is switched into the inactive operating state.

2. The microcontroller according to claim 1, wherein, after an activation phase and before the prompting circuit generates a next prompting signal, the microcontroller core disconnects the microcontroller using an automatic shutdown procedure.

3. The microcontroller according to claim 1,
    wherein the undervoltage detection circuit detects at least one of a sudden voltage drop and a gradual voltage drop, and
    wherein the microcontroller core switches the microcontroller from the active operating state to the inactive operating state based on one of the sudden voltage drop and the gradual voltage drop.

4. The microcontroller according to claim 1, wherein the further circuit includes a disconnectable phase-locking loop arrangement.

5. The microcontroller according to claim 1,
    wherein the first arrangement includes a time-switch logic arrangement, and
    wherein, after the predetermined time period, the time-switch logic arrangement acts on the prompting circuit to generate the prompting signal to the microcontroller core for switching the microcontroller from the inactive operating state to the active operating state.

6. The microcontroller according to claim 5, wherein the prompting signal activates the further circuit, the further circuit generating the circuit signal as a function of the oscillator signal, the microcontroller core switching the microcontroller from the inactive operating state to the active operating state using the second clock frequency.

7. The microcontroller according to claim 1,
    wherein the second arrangement includes a multiplexer, the multiplexer providing the oscillator signal to the microcontroller core to set a frequency of the microcontroller core equal to the first clock frequency.

8. The microcontroller according to claim 5,
    wherein the time-switch logic arrangement determines the predetermined time period, and
    wherein the time-switch logic arrangement includes a time-comparison register for storing the predetermined time period.

9. The microcontroller according to claim 1,
    wherein the low-frequency oscillator generates the oscillator signal having the first clock frequency equal to 100 kHz, and
    wherein the microcontroller core receives the circuit signal having the second clock frequency equal to 10 MHZ.

10. The microcontroller according to claim 1, wherein the undervoltage detection circuit is connected directly to an electrical-system voltage of the electrical adjusting drive for detecting undervoltage conditions without a time delay and for providing the undervoltage conditions to the microcontroller core, the electrical adjusting drive being provided in a motor vehicle.

* * * * *

UNITED STATES PATENT AND TRADEMARK OFFICE
CERTIFICATE OF CORRECTION

PATENT NO.   : 6,357,012 B1
DATED        : March 12, 2002
INVENTOR(S)  : Volker Aab It is certified that error appears in the above-identified patent and that said Letters Patent is hereby corrected as shown below:

Column 1,
Line 5, delete "on".
Line 17, change "and," to -- and --.
Line 37, change "having the characterizing features" to -- according to the present invention --.

Column 2,
Line 13, change "present" to -- present invention --.

Column 3,
Line 55, change "A voltages" to -- A voltage --.
Line 66, delete "is yielded for the buffer capacitance.".

Column 4,
Line 52, delete "said core".

Signed and Sealed this

Tenth Day of June, 2003

JAMES E. ROGAN
*Director of the United States Patent and Trademark Office*